Dec. 30, 1969          T. F. HALLORAN          3,487,349

FIRE RETARDANT COMPOSITION AND ELEMENTS COATED THEREWITH

Filed Nov. 6, 1967

INVENTOR
T. F. HALLORAN
ATTORNEY

3,487,349
FIRE RETARDANT COMPOSITION AND ELEMENTS COATED THEREWITH

Thomas F. Halloran, Parsippany-Troy Hills, N.J., assignor to Bell Telephone Laboratories, Incorporated, Murray Hill, N.J., a corporation of New York
Filed Nov. 6, 1967, Ser. No. 680,708
Int. Cl. C08g 45/16
U.S. Cl. 338—264      4 Claims

ABSTRACT OF THE DISCLOSURE

An epoxy-polyester fire retardant composition containing fire retardants, inorganic fillers and other additives does not flame, drip or flake under severe conditions, and is suitable for use on circuit elements.

---

This invention relates to an epoxy-polyester fire retardant composition which provides flame retardance even at 1000° F. without dripping or flaking. In particular the composition basically is a two package epoxy system in which one package comprises various partial esters having acid values of at least 50 and the second package comprises a curable epoxidized fatty ester; these are mixed with various filler materials capable of imparting mechanical and dielectric strength to the cured product, thus making it particularly well-suited for application on electrical components.

Background of the invention

A serious hazard encountered in the electronics industry is that of fire caused by excess current or voltage in the circuit components. In particular resistors are prone to overheating and can ignite the usual protective coatings found on them, resulting in either simple burning of the resistor involved or the spreading of the flame to nearby circuit components. Should the coating become flowable or crumbly at these temperatures there is the additional factor that flame may spread as the coating drips or flakes onto nearby circuitry. Unfortunately the common protective coatings used today, while offering some degree of flame retardance up to a point, tend to have poor insulating properties or cause spreading of the flame to adjacent electrical components by dripping or flaking of the coating. The invention of the application overcomes these disadvantages.

Summary of the invention

In accordance with the present invention an excellent flame retardant composition which is self-extinguishing, electrically insulating, and able to maintain its physical integrity (i.e. not physically fall apart by dripping or flaking) even at temperatures of 1000° F. and higher has been found. The inventive material basically is a cured epoxy-polyester resin containing well-known fire retardants and, most importantly, high-build inorganic fillers capable of imparting the desired physical as well as electrical characteristics.

The epoxy-polyester results from the curing of nondrying epoxidized fatty ester materials with various polymerized partial esters having acid values of at least 50. Typical of the epoxidized fatty esters are the fatty oils, fatty glycerides and fatty esters of long chain acids and epoxidized fatty alcohols. The partial esters used are derived from the reaction between polyhydroxylalcohols and polycarboxylic acids (alkyl or aromatic) or anhydrides, such as phthalic anhydride. Added to the basic epoxy-polyester system are filler materials, inorganic in nature, which impart added structural strength to the cured composition. Additional additives, such as mica to provide increased electrical insulation, can be included if for purposes in accord with fire retardancy.

Detailed description of the invention

Figure 1:
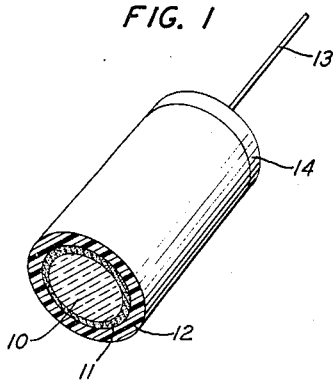
FIG. 1 is a cross section of a perspective view of a carbon deposited resistor protected by the inventive coating.

Today it is common to find resistors coated with various types of protective and fire resistant materials. A basic drawback to most materials used is the lack of film integrity at high temperatures and especially during flame-over, a defect which can result in the spreading of a local flame condition to nearby circuit elements. The inventive composition, however, is capable of functioning without flame-over at temperatures as high as 1000° F. without evidencing any dripping or flaking, and can be compounded in a form suitable for application in film form onto various substrates.

As noted, the fundamental ingredients in the epoxy-polyester system under discussion are polyesters and their reaction products made with curable nondryingepoxidized fatty ester materials. The polyesters contemplated by the invention are partial esters having acid values of at least 50, and derived from the reaction between polyhydroxylalcohols (1 part by weight) and polycarboxylic or anhydride materials (1–3 parts by weight). Examples of the polyhydroxylalcohols are ethylene glycol, propylene glycol, glycerol, trimethylalethane, sorbitol, pentaerythritol, dipentaerythritol and tripentaerythritol or mixtures of the same and the like. Generally, the polyols have from 2–12 hydroxy groups.

Examples of the anhydride and polycarboxylic acid materials are phthalic anhydride or acid, maleic anhydride or acid, hexachloroendomethylene tetrahydrophthalic anhydride or acid (chlorendic acid or anhydride), tetrachlorophthalic anhydride or acid, mixtures of the same and the like.

The functional essence of the polyester esterification product can be represented generally by the formula (although in fact it may be more complex).

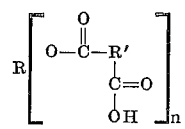

where $n$ is at least 2. R' and R are organic radicals of the acid and/or anhydride and polyalcohol compounds, respectively, and include the alkyl and aromatic groups. Esters which meet the requirements established by the invention are available commercially.

By way of example, when a mixture of phthalic anhydride and chlorendic acid is reacted with pentaerythritol the esterification product basically is the partial ester represented as follows:

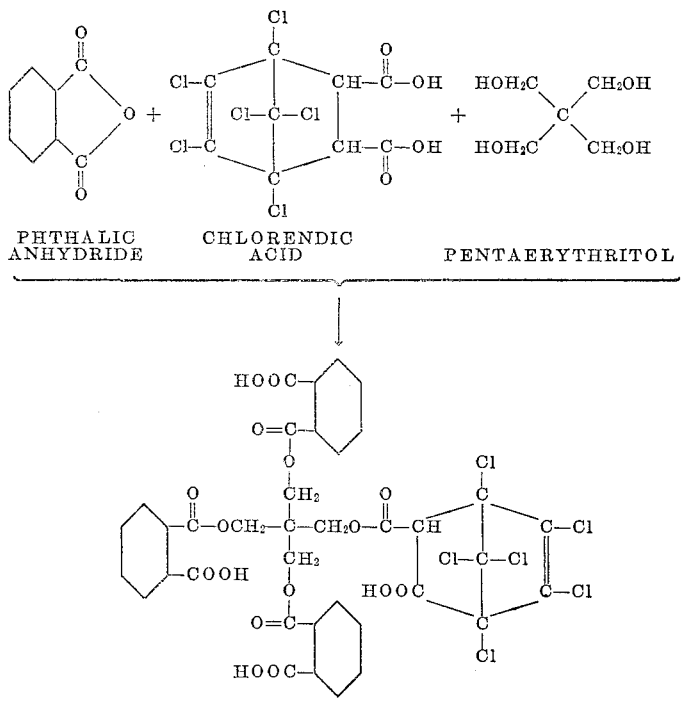

PHTHALIC ANHYDRIDE   CHLORENDIC ACID   PENTAERYTHRITOL

Typical of the epoxidized fatty esters are epoxidized fatty oils, such as soybean oil, safflower oil, linseed oil, or glycerides including their substituted mono and polyhydroxylalcohol derivatives which are basically esters of fatty acids with internal epoxy groups in the fatty chain portions. The fatty portion can be from 12–22 carbons long, while chain length of the nonfatty portion (eq. alcohol residue) ranges from 1–10 carbons with or without epoxy groups thereon. Generally there is an average of 4–6 epoxy groups per molecule.

The curing of the epoxidized ester with the partial ester esterification product can be carried out at room temperature or under the influence or some heating if more rapid curing is desired. The reaction is between the free carboxyl group on the partial ester and the epoxy group on the epoxidized fatty ester. The preferable proportion of ester to epoxidized material is about 1:1 on a weight ratio basis, although either material can advantageously be present in a ratio amount to the other from 0.7:1 to 1.5:1. Of the two, should the ester be the component present in greater quantity, the resulting cured material would be somewhat tougher but less adhering and somewhat brittle; on the other hand, improved adhesion is obtained with a predominance of the epoxidized material but with a sacrifice in toughness.

Of course the polyester and epoxidized materials must be kept separate in different packages until such time as curing is desired. However, when references to quantities of constituents are made in terms of weight percent, they are based on the total combined weight of all constituents. In these terms, the partial ester and the epoxidized fatty ester combined are typically present from 20–30 percent by weight.

Fire retardancy is imparted to the epoxy-polyester by the inclusion of certain fire retardant materials, such as antimony trioxide-coated silica particles and a chlorinated diphenyl (about 50–60% chlorine by weight). These two fire retardants form an excellent combination in ratio about 1.7:1 to 2.3:1 by weight, respectively, with combined amounts of the two from 15 to 21 weight percent. Less than the lower limit can result in diminished fire retardancy at significant levels, and amounts greater than the upper limit yield an undesirable soft composition with poor film integrity owing to the plasticizing nature of the diphenyl compound.

Of great importance to the success of the inventive composition is the presence of temperature-stable filler type materials, such as silicates, and in particular, aluminum silicate. The function of these fillers is to provide added internal support to the cured epoxy structure, both during the application of it as a film and at those times when the coated element may be exposed to very high temperatures, even those high enough to burn off many of the less stable additives in the composition.

The filler, which is among those materials in the composition with the highest resistance to temperature, will remain generally structurally integral even at relatively high temperatures and provide support for and lend cohesiveness to the composition, and thus arrest dripping or flaking. The filler typically can be added in a wide range of amounts. A suggested amount is approximately 10–20 percent filler by weight in the total combined composition, when the other constituents are in amounts as to be given herein. Lesser amounts noticeably affect the composition's high temperature structural integrity, and great quantities tend to significantly decrease the flowability of the composition. The later effect can of course be compensated for by the addition of certain solvents discussed below.

Several other ingredients are added to the formulation to impart certain desirable properties. One of these is carbon black, one function of which is to make a more efficient heat radiator of the inventive composition. In addition, where the coating is in contact with a carbon substrate, such as in resistors where exposed carbon itself is the resistive element, the addition of carbon black tends to minimize stresses induced in the resistor due to differences in the thermal coefficients of expansion of the composition and the carbon substrate; this in turn enhances the composition's resistance to cracking during use, especially under conditions where temperature cycling is frequent. Generally about 1–2 percent or so by weight carbon black is suitable for these purposes; the amount employed is not critical.

It is also desirable to add some quantity of mica (a silicate) to improve the dielectric strength of the composition. Typically about 10–20 percent by weight mica is included in the total composition. The measured dielectric strength of the composition of the invention is approximately 1000 volts DC/mil. Of course being a silicate the mica also behaves in the manner earlier attributed to the silicates when added as fillers; accordingly, the composition range of mica is determined by considerations similar to those alluded to above in connection with the silicates, with the further consideration that lesser amounts tend to diminish dielectric strength below that noted.

As a precaution against the tendency of the composition to settle-out, small amounts of antisettling materials such as oxidized polyethylene advantageously can be added in amounts of the order of 4 percent by weight based on the total composition; the amount employed is not critical. Also, if desired, the flowability of the composition can be improved by the addition of any commercial compositions intended for such purpose.

An appropriate vehicle for carrying all the compositions and additives discussed above is found in any of the usual organic solvents commercially available, e.g., toluene, methylisobutyl ketone or mixtures of the same. Typically solvent is present at approximately 13 percent by weight based on total composition. Variations from this figure will not affect the composition's basic properties especially in regard to its fire retardancy and structural integrity. However, for manufacturing reasons it is usually not desirable to employ a solution so thin that it becomes difficult for the composition to be built-up as a coating.

The partial ester and epoxidized fatty materials are kept in separate packages until such time as curing is desired. However, as to all other ingredients there is no compelling reason for them to be distributed in any particular way among the packages, although for convenience there may be, and no doubt are, reasons for certain preferred distributions. The example below is one distribution.

EXAMPLE

Package A

| Material: | Weight percent (Based on individual package) |
|---|---|
| Polyester (60%) | |
| Xylol (32%) | 43.24 |
| Cellosolve acetate (8%) | |
| Carbon black | 2.55 |
| Chlorinated diphenyl (54% chlorine) | 12.59 |
| Methylisobutyl ketone | 7.44 |
| Toluene | 8.65 |
| Mica | 23.53 |
| | 100.00 |

Package B

| Epoxidized fatty ester (90%) | 29.05 |
|---|---|
| Xylol (10%) | |
| Antimony trioxide-coated silica | 25.07 |
| Methylisobutyl ketone | 4.53 |
| Toluene | 7.82 |
| Mica | 3.45 |
| Aluminum silicate filler | 30.08 |
| | 100.00 |

Packages A and B are suitably mixed, and then cured at about 250° F. for one hour after application to the device or substrate to be protected. The following two types of resistors were protected in this manner.

A cylindrically shaped carbon-deposited resistor, a portion of which is shown in cross section in FIG. 1, having a ceramic core 10, and a deposited carbon layer 11, was covered with a fire retardant coating 12 of the inventive composition. Electrical connection to the carbon was made by conductor wire 13 through conductor cap 14. The resistor was intentionally operated at 64 times its rated power, which resulted in an operating temperature of about 1000° F. Even though these conditions were maintained, the fire retardant coating 12 did not exhibit any flame although some of its less stable constituents were driven off as smoke.

Figure 2:
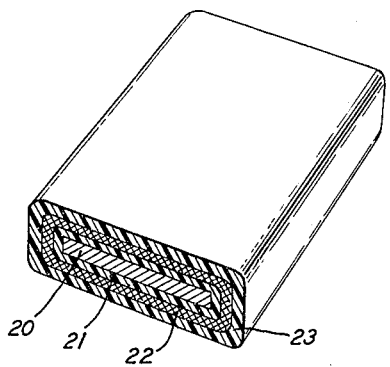
FIG. 2 is a cross section of a perspective view of a wire-wound resistor protected by the inventive coating.

A similar test also was performed on a wire-wound resistor of the type depicted in FIG. 2, which has a large volume of flammable components. The power was increased to a point where the resistor became red hot (900–1200° F.), and began to smoke. Continuation of power resulted in a slight flame resulting from the burning of the nylon and the inner coating; however the flame lasted only momentarily. At no time did the resistor coating flake or flow, which would have resulted in a serious fire hazard to other adjacent electrical components. The resistor basically was composed of metallic core 20, shown to have been rectangularly shaped in cross section in the figure, with an inner coating 21 of nonfire retardant but electrically insulating organic, and an outer coating 23 of the inventive fire retardant composition. Nylon insulated wire windings 22 were the resistive elements, and electrical connection to them was made by conventional means not shown. So constructed, inner coating 21 protected winding 22 from having their insulation frayed on the sharp edges of metallic core 20.

The invention has been described with reference to particular embodiments thereof, but it is intended that variations therefrom which basically rely on the teachings of the invention are to be considered within the scope of the description and the appended claims.

What is claimed is:

1. A coated resistor having thereon a flame retardant coating composition produced from initial ingredients comprising, on a total combined weight percent basis:

a nondrying epoxidized fatty ester having an epoxidized fatty chain portion 12–22 carbons in length with an average of 4–6 epoxy groups, and a nonfatty portion 1–10 carbons in length;

a polyester of an acid value of at least 50 produced by the reaction of one part polyhydroxyalcohol, having from 2–12 hydroxy groups, with 1–3 parts of at least one reactant selected from the group consisting of a polycarboxylic acid and an anhydride, said polyester being generally of the formula

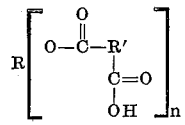

where $n$ is at least 2, R is the polyhydroxyalcohol radical, and R' is the radical of the reactant;

wherein said epoxidized fatty ester and polyester together are present in the composition from 20–30% and at a ratio from 0.7:1 to 1.5:1;

an inorganic filler from 10–20%;

antimony trioxide-coated silica and a chlorinated diphenyl (50–60% by weight chlorine) present together from 15–21% and at a ratio of 1.7:1 to 2.3:1 respectively;

mica from 10–20%;

carbon black from 1–2%;

oxidized polyethylene up to 4%; and remainder solvent.

2. The coated resistor of claim 1 wherein said epoxidized fatty ester is selected from the group consisting of soybean oil, safflower oil, linseed oil, glycerides and their substituted mono and polyhydroxyalcohol derivatives which are basically esters of fatty acids;

wherein said polyhydroxyalcohol is at least one selected from the group consisting of ethylene glycol, propylene glycol, glycerol, trimethylalethane, sorbitol, pentaerythritol, dipentaerythritol, and tripentaerythritol;

wherein said polycarboxylic acid is at least one selected from the group consisting of phthalic acid, chlorendic acid and tetrachlorophthalic acid;

wherein said anhydride is at least one selected from the group consisting of phthalic anhydride, chlorendic anhydride and tetrachlorophthalic anhydride;

wherein said inorganic filler is aluminum silicate;

wherein said solvent is at least one selected from the group consisting of toluene and methylisobutyl ketone.

3. The coated resistor of claim 1 wherein said resistor comprises a ceramic core with a resistive carbon layer thereon.

4. The coated resistor of claim 1 wherein said resistor comprises a metallic core with an electrically insulating organic layer thereon wrapped with electrically insulated wire windings.

References Cited

UNITED STATES PATENTS

| | | | |
|---|---|---|---|
| 1,322,073 | 11/1919 | Stuart | 338—264 |
| 2,026,616 | 1/1936 | Dike | 338—264 |
| 3,006,785 | 10/1961 | Canegallo | 117—218 |
| 3,081,202 | 3/1963 | Kemp | 117—218 |
| 3,218,274 | 11/1965 | Boller et al. | 260—22 |
| 3,257,345 | 6/1966 | Bond et al. | 260—22 |
| 3,333,970 | 8/1967 | Green | 117—137 |
| 3,374,114 | 3/1968 | Wiener | 117—218 |

OTHER REFERENCES

Industrial & Engineering Chemistry, vol. 59, No. 5, May 1967, pp. 99–101.

DONALD E. CZAJA, Primary Examiner

R. W. GRIFFIN, Assistant Examiner

U.S. Cl. X.R.

117—132, 137, 161; 260—22, 23, 32.8, 33.6, 40, 41; 338—308